Patented Dec. 12, 1922.

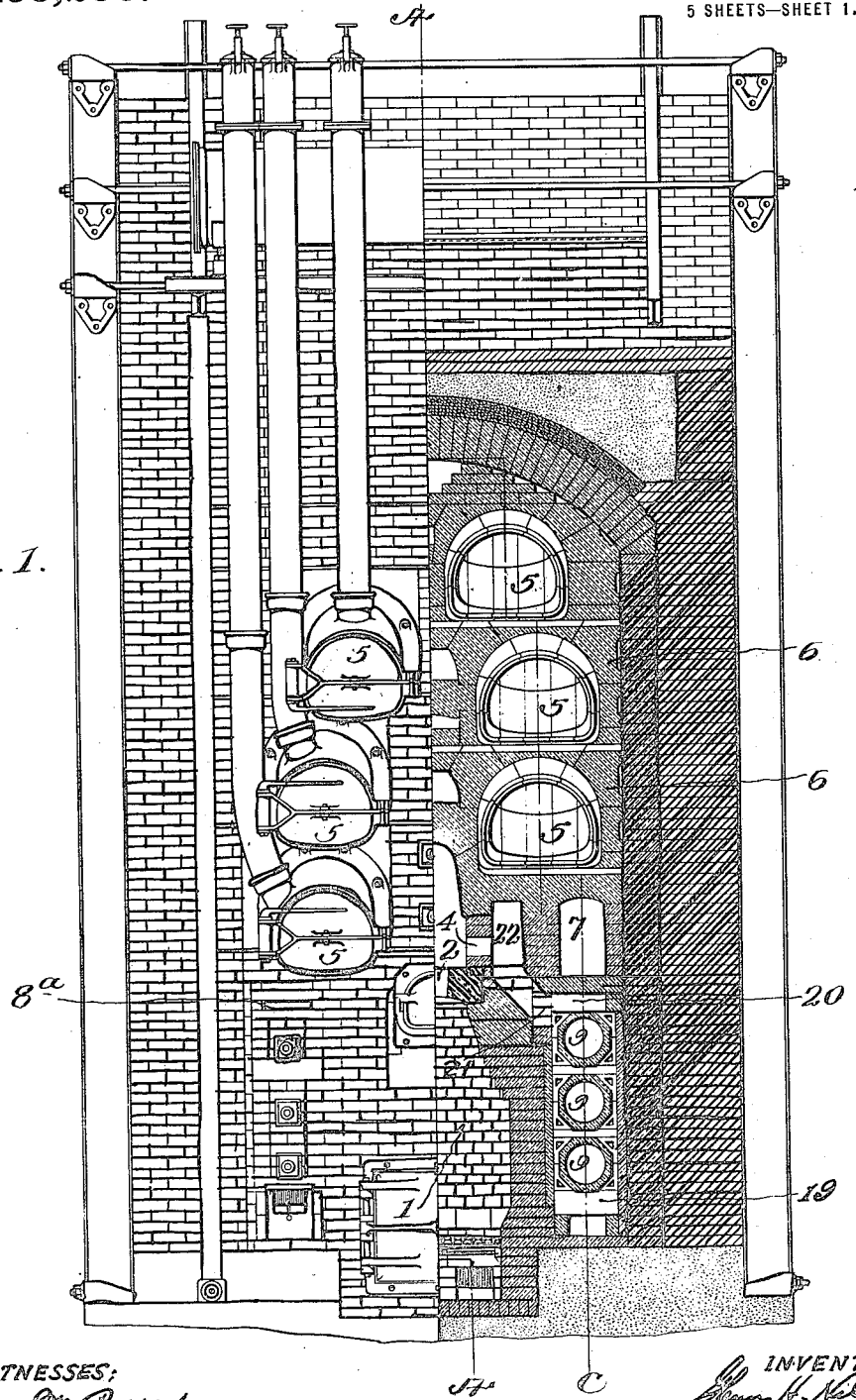

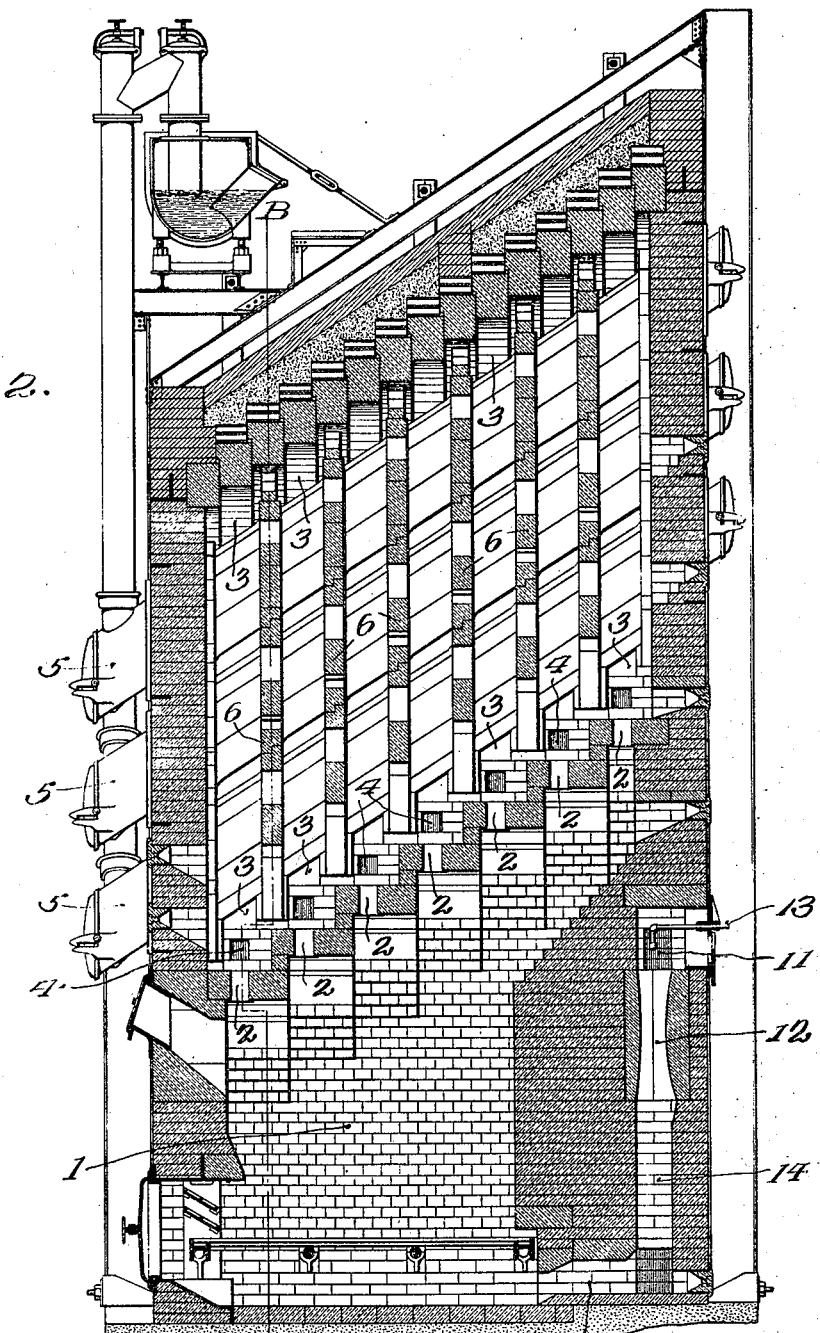

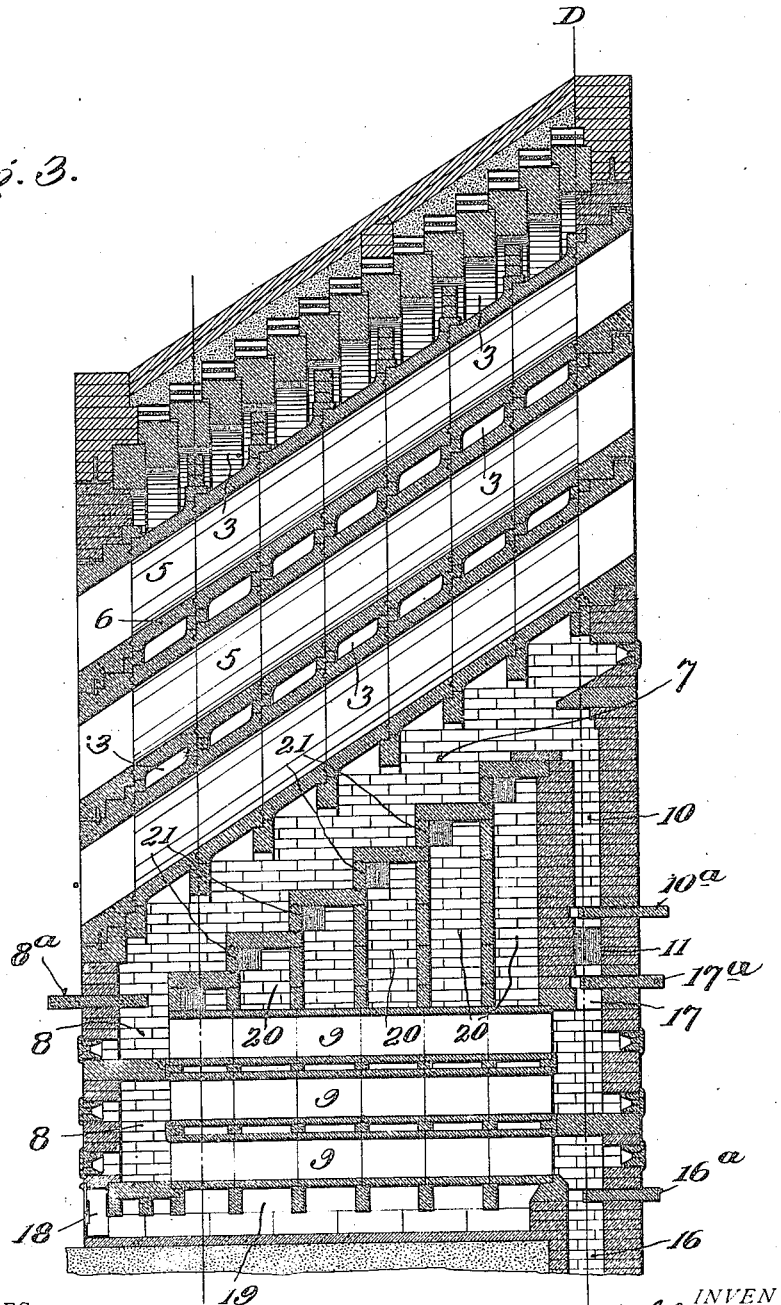

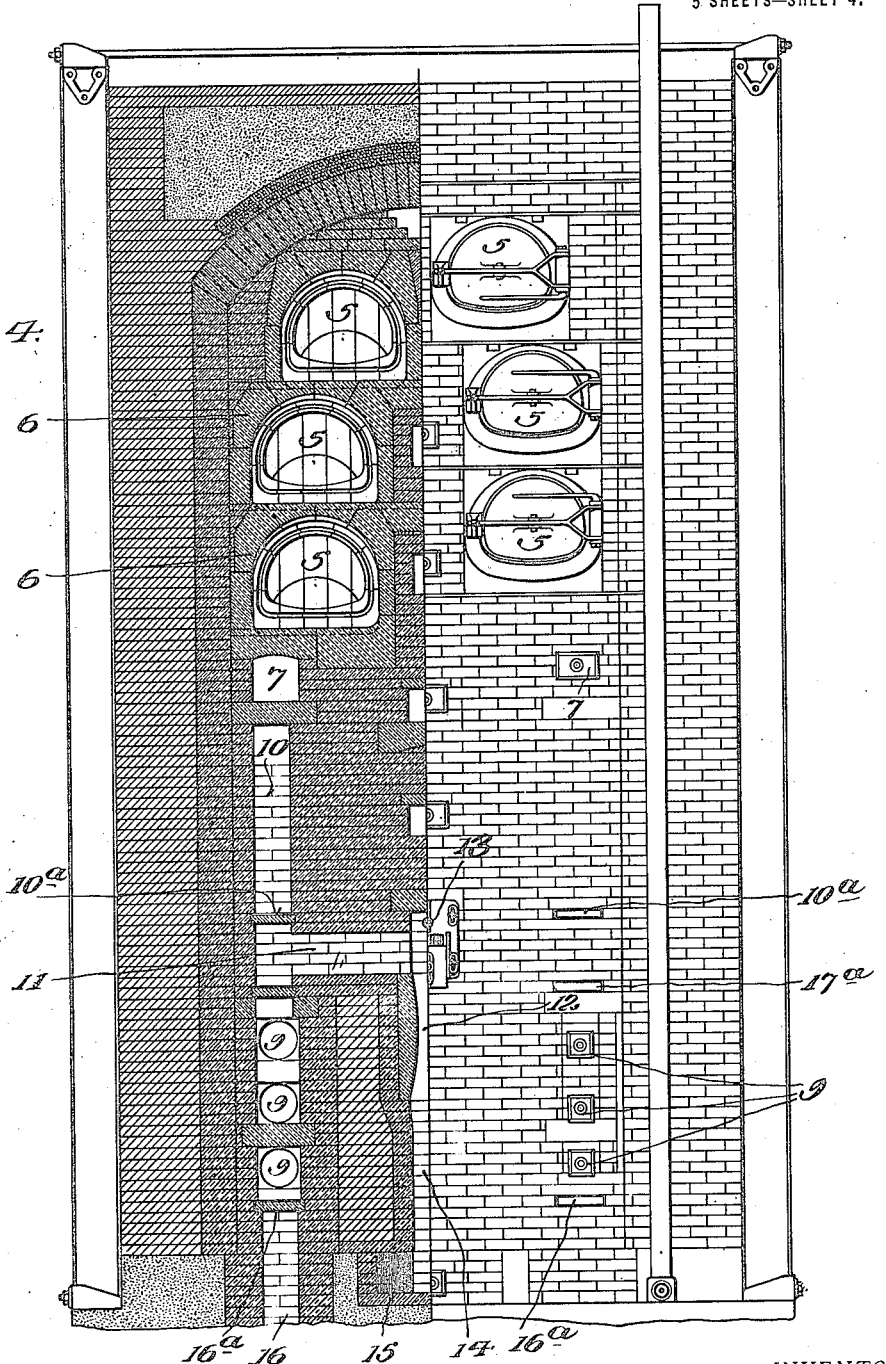

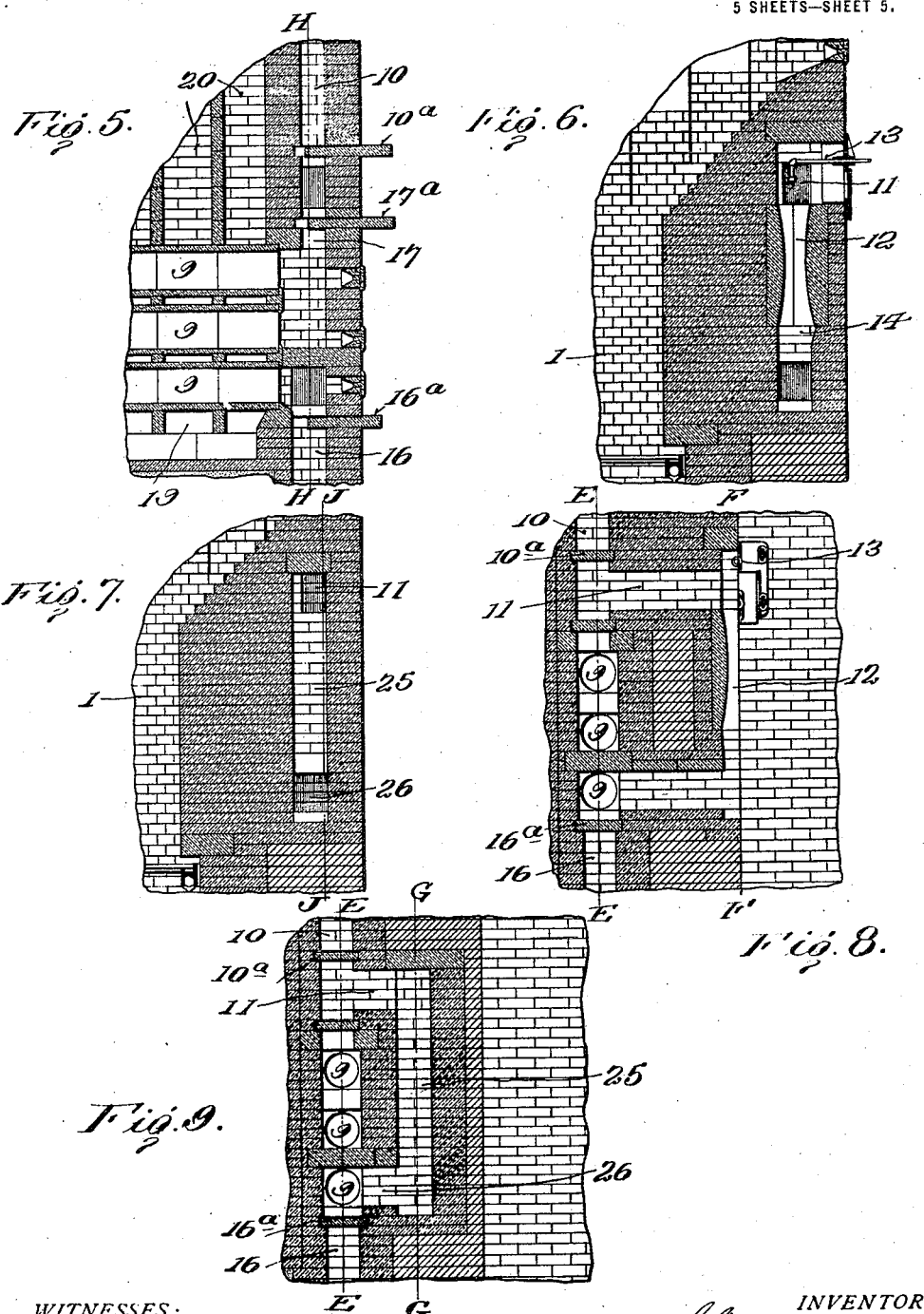

1,438,258

UNITED STATES PATENT OFFICE.

GLENN H. NILES, OF RIDGEFIELD PARK, NEW JERSEY, ASSIGNOR TO THE IMPROVED EQUIPMENT COMPANY, OF NEW YORK, N. Y., A CORPORATION OF COLORADO.

RETORT BENCH AND PROCESS OF OPERATING THE SAME.

Application filed January 3, 1916. Serial No. 69,991.

*To all whom it may concern:*

Be it known that I, GLENN H. NILES, a citizen of the United States, residing at Ridgefield Park, in the county of Bergen and State of New Jersey, have invented certain new and useful Improvements in Retort Benches and Processes of Operating the Same, of which the following is a specification.

This invention relates to retort benches and processes of heating the same; and it comprises a plurality of retorts, advantageously inclined, a heating chamber enclosing said retorts, a collection flue on one side of the enclosing chamber receiving hot products of combustion from the chamber, a recuperator located under the retorts, a connection between the said collection flue and one end of the recuperator for passing hot products of combustion therethrough and another connection between another point of said flue and another point of the recuperator whereby the products of combustion, through said enclosing chamber, may be divided into two streams, and an outlet conduit leading from the second mentioned connection whereby one of the said divided streams may be passed through the recuperator and the other stream may be passed to the outlet, together with a gas producer, flues leading therethrough to the said enclosing heating chamber, secondary air ports admitting air into the said chamber and means for causing either a forced or natural draft through the producer and, if desired, means for returning a portion of the products of combustion through the producer; all as more fully hereinafter set forth and as claimed.

A gas bench consists of a combustion chamber for heating retorts which may be vertical, horizontal or inclined, together with a gas producer, usually located below the retorts, and a recuperator system through which the products of combustion, after having passed over the retorts, are conducted to heat the secondary air to be mixed with the gas from the gas producer. It is necessary that the retorts be heated substantially evenly throughout their lengths, regardless of their size. Even heating however is a difficult matter because it is practically very hard to control the heat distribution. In inclined benches there is a tendency for the heat to localize at either the top or the bottom ends of the retorts according to the system of firing. If the producer is operated by means of an injector or other forced draft, the heat has a tendency to become greatest at the lower end of the retort; with a natural draft there is a tendency for the top end to become hottest. In benches having a horizontal retort, there is a tendency for the heat to "float", particularly if the retorts are too long, and there is also a tendency toward localized overheating.

The introduction of the use of carbon dioxid or products of combustion as an endothermic agent in the operation of bench producers (U. S. Patent 829,105) has aided materially in securing even heating both because of the resulting voluminous flame and because of the control of draft conditions it gives since in practice it is effected by the use of an air or steam injector which permits a more positive control of draft conditions within the combustion chamber than can be given by natural draft. It is customary to mount the injector which returns the products of combustion so that its inlet communicates with the recuperator or immediately above it and its delivery is at a point below the grate of the producer. In other words, the injector exercises suction on the gases leaving the combustion chamber and, through the producer, on the combustible gases entering it with the result that the draft conditions are made more positive.

The usual arrangement in benches having this system is to take off the products of combustion from one point on each side of the bench, these points being opposite each other. This arrangement results in a tendency of the gases passing through the combustion or retort chamber to draw off to a greater extent at one end. In the event that the point of offtake is in the recuperator, the flow of gases through the retort chamber tends to be strongly toward the inlet of the recuperator, while if the offtake be immediately above the recuperator at any point in the lower part of the retort chamber, the tendency is for the gases to go towards this offtake. Since the offtake is under induced draft from the injector while the escape of gases from the recuperator is under natural draft, there is a conflict of draft conditions in the bench.

In the present invention I have devised a system of controllably regulating the draft conditions in the gas bench which is particularly applicable to this type of bench using carbon dioxid return although useful in other types of bench. My object is to secure the noted advantages of positive control of draft while obviating the defects mentioned and to produce a type of draft control which will be applicable to the largest sizes of the gas benches now in use and to the still larger installations which are made possible by the use of built up retorts. In another application, Serial No. 837,871, filed May 11, 1914, I have described and claimed a gas bench provided with inclined retorts built up of silica material, each of the retorts being not only sectional along its length but each of the sections in turn being built up of segments. The sections are supported at their ends. With this arrangement, the size of the retort is practically unlimited; but with the increase in size of retorts which it gives comes the necessity for a still more positive type of control of draft conditions.

In the accompanying illustrations I have shown my invention as more particularly applied to a gas bench having inclined retorts of the sectional and segmental type of such copending application. In this illustration, Fig. 1 is a view, partly in elevation and partly in vertical section, of such a sectional-and-segmental retort bench, the view to the left being an elevation of the front of the bench while that to the right is a section along line BB, Fig. 2;

Fig. 2 is a central vertical longitudinal section through the bench on line AA of Fig. 1;

Fig. 3 is a longitudinal vertical section on line AC of Fig. 1;

Fig. 4 is a view, partly in elevation and partly in section, the showing to the right being in elevation of the rear of the bench while that to the left is a vertical cross section on line DD of Fig. 3;

Fig. 5 is a fragmental longitudinal view through the rear end of the recuperator on lines EE of Fig. 8 and EE of Fig. 9 showing a slight modification;

Fig. 6 is a longitudinal view through the injector on line FF, Fig. 8;

Fig. 7 is a longitudinal view on line GG, Fig. 9;

Fig. 8 is a cross section on line HH, Fig. 5; and

Fig. 9 is a cross section on line JJ, Fig. 7.

Referring to the drawings, reference numeral 1 indicates a gas producer as a whole. Gas generated in the producer passes directly through outlets or nostrils 2 into heating chamber 3 and is met by secondary air through tuyeres 4. The retorts 5 are shown supported in inclined position by walls 6 constituting the retort supporting columns or partitions and dividing the heating chamber into sub-chambers. The flame resulting from the admixture of air and gas from nostrils 2 and tuyeres 4, passes into the heating chamber surrounding the retorts. The intensity of this heat is regulated by control of the draft through the producer and this control is accomplished by means of a special arrangement of flues and dampers constituting an important feature of my invention.

From the top of the heating chamber 3 the products of combustion pass downwardly to two substantially parallel collecting flues 7 located above the recuperator, one on each side of the bench. From collecting flues 7 the products of combustion pass either as a whole or in part to the downtakes 8 and thence into the gas flues of the recuperator where they serve to heat incoming air which is to be used as secondary air to be mingled with the gas from the gas producer. Portions of the products of combustion from collecting flues 7 may be shunted around the recuperators. That is to say, the stream of products of combustion from heating chamber 3 may be divided; a part may be allowed to pass through the recuperators as just explained and the other part may be passed down vertical flues 10 and into horizontal flues 11 to the injector throat 12 (Figs. 2 and 4), where they are blown by the steam jet 13 into the vertical flues 14 and horizontal flues 15, through which they enter the producer beneath the grates. The passage of the products of combustion through the vertical flue or downcomer 8 is controlled by damper $8^a$, while the passage of products of combustion through vertical flue 10 is controlled by damper $10^a$. The passage of products of combustion to the chimney flue 16 is controlled by damper $16^a$. There is also provided a connection from the rear end of the upper section of the recuperator into the horizontal flue 11 through the opening 17, controlled by damper $17^a$. Secondary air enters through the air inlet 18 into the horizontal flue 19 passing upwardly around the outside of gas flues 9 of the recuperators into the collecting chambers 20 and from thence through air ports 21 into the flues 22 and from thence into the heating chamber 3 through nostrils 4.

The primary air is drawn in through an air damper at the back and is blown through the injector throat 12 with the products of combustion by means of jet 13. If the retorts heat up unduly at the front of the bench, dampers $8^a$ may be partly closed and the dampers $10^a$ partly opened, so that some of the gases will draw from the flue 10 with the result that the heat of the retorts will be equalized in following the draft. In case it should be necessary, on account of heat distribution in the retorts, to draw all or most of the products of combustion through flue 8, it is nevertheless possible to obtain any required amount of products of combustion in flue 11 by regulation of dampers 10ª and 17ª which adjust respectively the proportions drawn directly from the combustion chamber and from the recuperator system.

While I have described my invention as particularly applicable to benches carrying inclined retorts, it is not limited to this and while I have described my invention for use in connection with return systems for products of combustion and for forced draft operated producers, it is substantially equally advantageous in use with producers not employing the $CO_2$ return system nor forced draft.

Referring to Figs. 5, 6 and 8, the control of the products of combustion passing out of collecting flues 7 is as above described, but instead of the waste gases passing through flues 14 into flues 15 under the grate, they pass directly around the recuperator and into flue 16 above the damper 16ª and close to the outlet of the recuperator. By this arrangement it does not become necessary to pass all the products of combustion through the recuperator, a part being passed through the recuperator while a part is shunted directly to the chimney flue. But the injector for inducing a positive draft through flues 10 and 11 may be used.

According to another modification shown in Figs. 5, 7 and 9, the injector is dispensed with, the bench depending upon natural draft. A certain portion of the gases may be passed around the recuperator as shown by the flues 11, 25 and 26. In benches where the $CO_2$ return system is not used, the primary air would be furnished to the producer by the usual means, such as by means of an opening in the ash door.

In addition to the advantages of controlling the draft conditions in the furnace chamber afforded by the present invention, there is also some advantage in that a portion of the products of combustion returned to the producer is taken off from the furnace chamber at a higher temperature than is practicable in the case of products of combustion sent to the producer after having passed through a recuperator. Other things being equal, the more heat that can be put unto the producer with the returned products of combustion, the greater is the economy of operation.

What I claim is:—

1. The process of heating gas benches which comprises burning gas from a producer with secondary air around retorts therein, collecting the products of combustion and dividing them into two streams of regulable volumes, passing one of said streams through a recuperator for preheating the said secondary air, blowing the other stream in regulated amount directly through the producer generating said producer gas and varying the relation between said volumes independently of the blowing means.

2. The process of heating gas benches which comprises burning gas from a producer with secondary air around retorts therein, collecting the products of combustion and dividing them into two streams of regulable volumes, passing one of said streams through a recuperator for preheating the said secondary air, blowing the other in admixture with primary air in regulated amount directly through the producer generating said producer gas and varying the relation between said volumes independently of the blowing means.

3. The process of heating gas benches which comprises burning gas from a producer with secondary air around retorts therein, collecting the products of combustion and dividing them into two streams of regulable volumes, passing one of said streams through a recuperator for preheating the said secondary air, blowing the other stream in admixture with primary air directly through the producer generating said producer gas by means of a current of steam and varying the relations between said volumes independently of the blowing means.

4. In the heating of large furnace chambers by producer gas firing with return of products of combustion from such chamber to and through the producer, the process which comprises withdrawing products of combustion from a plurality of points in such chamber for return to the producer, the volume of products withdrawn at the several points being independently controlled.

5. In the heating of large furnace chambers by producer gas firing with return of products of combustion from such chamber to and through the producer, the process which comprises withdrawing products of combustion from a plurality of points in such chamber for return to the producer, the volume of products withdrawn at the several points being independently controlled and one such point of withdrawal being from a point immediately beyond the heating chamber.

6. In a gas bench, a plurality of retorts, a heating chamber enclosing said retorts, a collecting flue on one side of said chamber withdrawing gases from said heating chamber at various points, said collecting flue being provided with two outlets separated a substantial distance from each other, one of which is connected to a forced draft device, whereby draft conditions within said heating chamber may be adjusted.

7. In a gas bench, a plurality of retorts, a heating chamber enclosing said retorts, a gas producer supplying gas to said heating chamber and adapted for operation with return of products of combustion, and a collecting flue at one side of said heating chamber, passages connecting said heating chamber and said collecting flue and withdrawing gases from said heating chamber at various points, said collecting flue having a plurality of outlets separated a substantial distance from each other, one of said outlets connecting to a recuperator and another of said outlets connecting with the draft inlet of the producer.

8. In a furnace, a heating chamber, said heating chamber having a plurality of draft outlets, one of said outlets being connected to natural draft means, another outlet separated a substantial distance from said first mentioned outlet and connected to forced draft means and damper means arranged in the outlets to regulate the flow of gases through said outlets independent of the draft means.

9. In a furnace, a heating chamber having recuperative firing means, said heating chamber having a plurality of draft outlets at various points for products of combustion formed therein, one of said outlets being connected to said recuperative means while another is located at a substantial distance from the first said outlet and is connected to forced draft means, and damper means arranged in each of the outlets to regulate the flow of gases from the heating chamber.

10. In a gas bench, a plurality of retorts, a heating chamber enclosing said retorts, a recuperator located below the retorts and a gas producer, means for passing secondary air from the recuperator to the said heating chamber, means for collecting the products of combustion from said chamber and for dividing it into a plurality of streams, and for directing one of said streams through the recuperator to preheat the secondary air, means for directing another stream away from said recuperator and means for admixing said second stream with primary air and forcing the mixture through the producer.

11. In a gas bench the combination of a producer, a heating chamber arranged above the producer, a plurality of inclined retorts arranged in said heating chamber, a recuperator located below said retorts at the side of the producer, an inclined collecting flue arranged between the retorts and the recuperator, said collecting flue being connected to said recuperator at its forward end, a vertical passage arranged at the opposite end of said inclined collecting flue and connected to the opposite end of the recuperator, and an outlet conduit tapping said vertical flue.

12. In a gas bench the combination of a producer, a heating chamber arranged above the producer, a plurality of inclined retorts arranged in said heating chamber, a recuperator located below said retorts at the side of the producer, an inclined collecting flue arranged between the retorts and the recuperator, said collecting flue being connected to said recuperator at its forward end, a vertical passage arranged at the opposite end of said inclined collecting flue and connected to the opposite end of the recuperator, and an outlet conduit tapping said vertical flue, said outlet conduit being connected to the producer below the grate.

In testimony whereof, I affix my signature.

GLENN H. NILES.